Patented May 11, 1954

2,678,285

UNITED STATES PATENT OFFICE 2,678,285

ARTICLES COMPRISING SYNTHETIC THERMOPLASTIC MATERIALS AND METHOD FOR COATING SAME

John Browning, Welwyn, England, assignor to Imperial Chemical Industries Limited, a corporation of Great Britain No Drawing. Application December 4, 1951, Serial No. 259,906

Claims priority, application Great Britain December 22, 1950

16 Claims. (Cl. 117—138.8)

This invention relates to the treatment of surfaces of films, sheets and coatings comprising organic thermoplastic materials.

Articles formed from many synthetic resins have a propensity to develop strong electrostatic charges which make them difficult to manipulate, and cause them to accumulate dust deposits on their surfaces. The difficulty of manipulation is particularly marked in cases where flat surfaces of the articles contact each other, as, for example, in the use of sheet and film of the thermoplastic material. It is particularly disadvantageous in the case of thin, hydrophobic thermoplastic film of types which are widely used in the packaging industry, since it causes sheets of the film to be difficult to separate and prevents satisfactory slipping of the film in automatic packaging machinery. Smooth-surfaced thermoplastic films, such as polythene, polyethylene terephthalate or plasticised polyvinyl chloride films, suffer from the additional disadvantage that air tends to be excluded from between the sheets of film, particularly if the film is limp, or if light pressure has been applied, as, for example, when the film has been wound up tightly, and this further reduces the slip of the film.

Various substances have been proposed as sizes for the treatment of articles of synthetic thermoplastic materials in order to reduce the tendency of their surfaces to accumulate electrostatic charges. We have found, however, that whereas some of the substances proposed have given excellent results when applied to roughened surfaces, such as the surfaces of crinkled, decorative sheeting, and hazy film whose haziness is due to surfaces which are very slightly rough, it has been difficult to apply them successfully to highly smooth surfaces, particularly to surfaces of hydrophobic materials. The characteristics of such surfaces cause the sizing solution to coalesce into isolated droplets on drying, thus giving film having a blotchy appearance, poor slip and unsatisfactory electrostatic properties. It has also been proposed to increase the slip and ease of separation of film by applying to its surfaces talc, chalk or a similar material. These substances, however, scratch the surface of the film and spoil its appearance and clarity.

Since the clarity of thermoplastic film depends mainly on the smoothness of its surfaces, and since it is obviously desirable that film for use in packaging and like applications should have a high degree of clarity, the absence of suitable sizes for thermoplastic film having highly smooth surfaces has been a serious problem to the film-producing industry.

It is an object of the present invention to provide sheets, films and coatings comprising organic thermoplastic materials, having improved surface characteristics. It is another object to provide a process for the treatment of films, sheets and coatings, comprising organic thermoplastic materials, to improve their surface characteristics, enhancing their slip and inhibiting the accumulation of electrostatic charges thereon.

In accordance with the present invention a process of treating the surface of a sheet, film or coating comprising an organic thermoplastic material includes the step of contacting said surface with a composition comprising a solution of a surface active agent which will wet but not dissolve said surface, having dispersed therein a finely divided polymeric material.

The present invention also consists in a sheet, film or coating comprising an organic thermoplastic material, having uniformly distributed on a surface or surfaces thereof a surface active agent and a finely divided polymeric material. The particles of polymeric material are preferably adherent to the said surface or surfaces; sufficient adherence may be produced, for example, by depositing the particles from a dispersion of the polymeric material in the manner hereinbefore described.

The solution of the surface active agent used in the process of this invention will normally be an aqueous solution; other solvents may be used provided that the solution does not dissolve the surface to be treated.

The polymeric material is preferably not harder than the surfaces to be treated in accordance with the invention. The surfaces then show complete freedom from scratching by the particles of polymeric material when two surfaces are superimposed and rubbed together. The use of harder polymeric materials gives surfaces which become very slightly scratched if they are continuously rubbed together; this scratching is, however, practically negligible in comparison with the abrasive action of agents such as chalk and talc. The polymeric material preferably has an average particle size of from 0.1 to 20 microns, sizes of from 1 to 15 microns being particularly preferred. Suitable polymeric materials include polythene, polytetrafluoroethylene, polytrifluoromonochloroethylene, interpolymers of ethylene with other polymerisable materials, vinyl polymers such as polyvinyl chloride and polyvinyl acetate, and superpolyamides.

The compositions of the present invention may contain, in addition to the dispersed polymeric material, an emulsified wax; this helps to ensure permanence of the improved surface characteristics imparted by the process if the particles of the dispersed polymer used are found to be insufficiently adherent to the surface to be treated. Suitable waxes include microcrystalline petroleum wax, beeswax, paraffin wax and polyethylene and polyisobutylene waxes. Usually, however, the polymer particles are sufficiently adherent to the surface without the use of waxes.

Among synthetic thermoplastic materials used for the production of film, polythene can be processed by melt extrusion into limp film which has a high degree of smoothness and clarity and is highly resistant to water and water vapour. While these properties are extremely desirable in film for use in packaging and like applications, and have in fact led to a very great demand for polythene film for such uses, they combine with the high electrostatic propensity of the film to produce difficulty in handling, and prevent the satisfactory treatment of the film with antistatic agents by methods known hitherto. Moreover, the surface softness of polythene precludes the use of chalk, talc and similar materials as spacing agents for smooth film. The process of our invention is, therefore, of particular utility in its application to the treatment of clear polythene film. For this purpose the process has an additional advantage in that the surface of the treated polythene film is more easily printed upon, by conventional methods, than is the surface of untreated polythene film. Another film whose properties, particularly those of flexibility, clarity and surface lustre, make it particularly useful as a packaging material, is polyethylene terephthalate film. Use of the process of this invention has been found to result in substantial reductions in the electrostatic propensity and coefficient of friction of polyethylene terephthalate film. For the treatment of this and other films having a high degree of surface lustre, it is preferred to use as little of the dispersed material as is necessary to obtain adequate improvement of the electrostatic propensity and coefficient of friction. Further improvement may necessitate some slight sacrifice of the excellence in appearance of the film. It is still possible, however, to produce maximum improvement of these surface characteristics and yet obtain a treated film of very good appearance.

Because of their softness, polymeric materials which are especially suitable for the dispersions used in the process of this invention are polythene and polytetrafluoroethylene. They are particularly preferred for the surface treatment of polythene, which has a softer surface than most organic thermoplastic materials, and if dispersed polythene is used for the surface treatment of polythene films, sheets or coatings it is preferably of lower molecular weight than the polythene of the surface.

Since films, sheets and coatings of organic thermoplastic materials have as a valuable property the ability to be joined together by heat-sealing, the surface active agent used in the process of this invention is preferably one which is not decomposed at the normal heat-sealing temperature, and which does not reduce the strength of the heat seals. For polythene and polyethylene terephthalate film, surface active agents which are particularly suitable in this respect are water-soluble alkyl aryl polyglycol ethers having the general formula

where R is a benzene ring substituted at least once by an alkyl or cycloalkyl group, and especially those in which $x$ is from 8 to 14 inclusive. These are readily prepared by reacting ethylene oxide with an alkyl and/or cycloalkyl substituted phenolic compound, such as dibutyl phenol, diamyl phenol, cyclohexyl phenol, octyl phenol, isooctyl phenol, dodecyl phenol, a di-tertiary butyl cresol, or di-tertiary hexyl phenol. Surface active agents suitable for use where heat-sealing properties of the surfaces are not necessary include salts of sulphated fatty alcohols, such as sodium lauryl sulphate and sodium cetyl sulphate, and condensation products of ethylene oxide with long-chain fatty alcohols, such as cetyl alcohol.

In preparing the compositions used in the process of this invention the dispersion of polymeric material may be produced by any of the methods known to the art, the said surface active agent being dissolved in the water before or after the polymeric material is dispersed therein. In some cases the surface active agent which is used to reduce the electrostatic propensity of the film may be used also as dispersing agent for the polymeric material; but it is often found that one surface active agent does not fulfil both of these functions with the greatest advantage. In such cases it is preferred to use different surface active agents for the two functions, and it is then generally most convenient to prepare a concentrated dispersion of the polymeric material in the presence of a dispersing agent, and to mix with water calculated amounts of this dispersion and of the surface active agent chosen to reduce the electrostatic propensity of the surface to be treated. The optimum amounts of surface active agent and polymeric material present in the composition depend partly upon the method by which the composition is to be applied to the surface to be treated; generally it is preferred to use from 0.25% to 10% by weight of the surface active agent, and from 0.1% to 5% by weight of the polymeric material. As stated hereinbefore, in the treatment of films having particularly lustrous surfaces it is preferred to use as little as necessary of the dispersed polymeric material. When a wax is used in the composition, it may be dispersed with the polymeric material. An amount of from 0.01% to 0.1% is usually satisfactory.

The composition may be applied to the surface of the article by any convenient method such as dipping, spraying, brushing or roll-coating. Where a water-cooling step is used in the production of the article the water may be replaced by the sizing composition, or the article may be passed, after cooling, through an additional bath containing the sizing composition. The article, after sizing, is preferably dried by passing it between a pair of squeegee rollers and then, if necessary, exposing it to currents of air, which may be warmed.

Our invention is illustrated but in no way limited by the following examples, in which percentages given are by weight.

*Example 1*

A highly transparent film, 0.002 inch thick, of polythene having an average molecular weight of 18,000 was passed through a bath of water to which had been added 0.5% of a condensation product of isooctyl phenol and ethyleneoxide, having the formula—

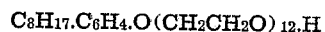

and 0.5% of an aqueous emulsion containing 6% of triethanol amine stearate and 30% of polythene, the polythene having an average particle size of approximately 7 microns, and an average molecular weight of 13,000. On emergence from the bath the film was passed between a pair of squeegee rollers and dried by means of warm air. The treated film was found to have an electrostatic propensity of .03 kilovolt/ft., compared with 1.0 kilovolt/ft. for the untreated film, and a coefficient of friction of 0.4, compared with 0.9 for the untreated film. Heat seals obtained under identical conditions with the treated and untreated film were of equal strength and were identical in appearance. There was no significant difference in the clarity or general appearance of the treated and untreated film.

*Example 2*

A highly transparent film, 0.002 inch thick, of polythene having an average molecular weight of 18,000 was passed through a bath of water containing 0.5% of a condensation product of isooctyl phenol and ethylene oxide having the formula $$C_8H_{17}.C_6H_4.O(CH_2CH_2O)_{12}.H$$

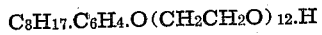

and 0.15% of dispersed polytetrafluoroethylene having an average particle size of approximately 7 microns. The film on emergence from the bath was passed between a pair of squeegee rollers and dried by means of warm air. The treated film was found to have an electrostatic propensity of 0.03 kilovolt/ft. compared with 1.0 kilovolt/ft. for the untreated film, and a coefficient of friction of 0.3, compared with 0.9 for the untreated film. There was no significant difference in the clarity or general appearance of the treated and untreated film, and the treatment had no effect on the heat sealability of the film.

*Example 3*

A film of polyethylene terephthalate 0.002 inch thick was treated in the same way as the polythene film in Example 1. The treated film was found to have a coefficient of friction of 0.2, compared with 0.3 for the untreated film, and an electrostatic propensity of 0.10 kilovolt/ft. compared with 0.50 kilovolt/ft. for the untreated film. The difference in lustre between the treated and untreated film was barely perceptible.

I claim:

1. The process which comprises applying to the surface of thin and flexible sheets, films and coatings of organic thermoplastic, polymeric materials having a tendency to accumulate electrostatic charges thereon and possessing undesirable slip characteristics, a dispersion of finely-divided, discrete particles of polymeric resinous material having an average particle size of from 0.1 to 20 microns and containing a surface active agent which wets but does not dissolve said surface, said dispersion being applied to said surface in an amount sufficient to improve the slip characteristics of said surface and diminish the tendency thereof to accumulate static charges, and thereafter drying said surface.

2. A process according to claim 1 in which said solution is an aqueous solution.

3. A process according to claim 1 in which the dispersed polymeric material is not harder than the surface to be treated.

4. A process according to claim 1 in which said surface active agent is a water-soluble alkyl aryl polyglycol ether having the general formula R.O(CH₂CH₂O)x.H wherein R is a benzene ring substituted at least once by a radical selected from the groups consisting of alkyl and cycloalkyl radicals, and wherein x is an integer from 8 to 14 inclusive.

5. A process according to claim 1 in which said dispersion contains from 0.25% to 10%, by weight, of the surface active agent.

6. A process according to claim 1 in which said dispersion contains from 0.1% to 5%, by weight, of the dispersed polymeric material.

7. A process according to claim 1 in which said dispersion contains an emulsified wax.

8. A process according to claim 1 in which the finely divided polymeric material is polythene.

9. A process according to claim 1 in which the finely divided polymeric material is polytetrafluoroethylene.

10. A process according to claim 1 used for the surface treatment of polythene film.

11. A process according to claim 1 used for the surface treatment of polyethylene terephthalate film.

12. A process according to claim 1 in which the dispersed polymeric material has a particle size from 1 to 15 microns.

13. A process according to claim 1 in which said dispersion contains from 0.01% to 0.1% by weight of emulsified wax.

14. The process which comprises applying to the surface of thin and flexible sheets, films and coatings of polythene, a dispersion of from 0.1% to 5%, by weight, of finely divided polythene having a particle size of from 0.1 to 20 microns, said dispersion containing from 0.25% to 10%, by weight, of a water-soluble alkyl aryl polyglycol ether having the general formula R.O(CH₂CH₂O)xH wherein R is a benzene ring substituted at least once by a radical selected from the group consisting of alkyl and cycloalkyl radicals, and wherein x is an integer from 8 to 14 inclusive, and being applied to said polythene surface in an amount sufficient to improve the anti-static and slip characteristics of said surface, and thereafter drying said surface.

15. A process according to claim 1 wherein said sheets, films and coatings of organic thermoplastic material are transparent.

16. Thin, flexible sheets, films and coatings of organic thermoplastic material normally possessing undesirable slip characteristics and a tendency to accumulate electrostatic charges thereon, said sheets, films and coatings having uniformly distributed on the surface thereof, a finely divided thin, flexible layer of discrete particles of polymeric resinous material having an average particle size of from 0.1 to 20 microns and a surface active agent thereby improving the antistatic and slip characteristics of said thermoplastic material.

References Cited in the file of this patent

UNITED STATES PATENTS

| Number | Name | Date |
|---|---|---|
| 2,005,619 | Graves | June 18, 1935 |
| 2,176,053 | Billing | Oct. 17, 1939 |
| 2,279,501 | Dickey et al. | Apr. 14, 1942 |
| 2,358,355 | Stamatoff | Sept. 19, 1944 |